(12) United States Patent
Salamah et al.

(10) Patent No.: US 6,617,749 B2
(45) Date of Patent: Sep. 9, 2003

(54) RE-ENTRANT SPACEBLOCK CONFIGURATION FOR ENHANCING CAVITY FLOW IN ROTOR ENDWINDING OF ELECTRIC POWER GENERATOR

(75) Inventors: Samir Armando Salamah, Niskayuna, NY (US); Todd Garrett Wetzel, Niskayuna, NY (US); Christian Lee Vandervort, Voorheesville, NY (US); Emil Donald Jarczynski, Scotia, NY (US); Wayne Nigel Owen Turnbull, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/742,279

(22) Filed: Dec. 22, 2000

(65) Prior Publication Data

US 2002/0079784 A1 Jun. 27, 2002

(51) Int. Cl.$^7$ ............... H02K 3/46; H02K 1/32; H02K 9/00; H02K 9/06; H02K 3/24
(52) U.S. Cl. ............... 310/270; 310/65; 310/61
(58) Field of Search ............... 310/270, 65, 61

(56) References Cited

U.S. PATENT DOCUMENTS

| | | | | |
|---|---|---|---|---|
| 1,819,860 A | * | 8/1931 | Belfils ............... | 310/61 |
| 1,927,890 A | * | 9/1933 | Fechheimer ............... | 171/207 |
| 2,786,951 A | * | 3/1957 | Morgan ............... | 310/61 |
| 2,833,944 A | * | 5/1958 | Willyoung ............... | 310/61 |
| 2,844,746 A | * | 7/1958 | Coggeshall ............... | 310/65 |
| 3,225,231 A | * | 12/1965 | Kudlacik ............... | 310/64 |
| 3,465,183 A | * | 9/1969 | Wallenstein ............... | 310/54 |
| 3,846,651 A | * | 11/1974 | Mishra ............... | 310/61 |
| 4,071,790 A | * | 1/1978 | Darby et al. ............... | 310/59 |
| 4,141,669 A | * | 2/1979 | Darby et al. ............... | 408/1 R |
| 4,301,386 A | * | 11/1981 | Schweder et al. ............... | 310/59 |
| 4,335,324 A | * | 6/1982 | Fujioka et al. ............... | 310/61 |
| 4,352,034 A | * | 9/1982 | Karjan et al. ............... | 310/59 |

(List continued on next page.)

OTHER PUBLICATIONS

U.S. patent application Ser. No. 09/739,358 filed Dec. 19, 2000.

U.S. patent application Ser. No. 09/742,281 filed Dec. 22, 2000.

*Primary Examiner*—Dang Le
*Assistant Examiner*—Pedro J. Cuevas
(74) *Attorney, Agent, or Firm*—Nixon & Vanderhye PC

(57) ABSTRACT

A gas cooled dynamoelectric machine is provided that is comprised of a rotor, a rotor winding comprising axially extending coils and concentric endwindings, and a plurality of spaceblocks located between adjacent endwindings thereby to define a plurality of cavities, each bounded by adjacent spaceblocks and adjacent endwindings. To enhance the heat transfer rate from the copper end turns of the field endwinding region, the downstream wall of at least one spaceblock is contoured to lower a suction pressure developed at the trailing edge of the spaceblock. In a preferred embodiment, the downstream wall of the spaceblock has a re-entrant contour to enhance the rotating cavity cooling flow.

13 Claims, 6 Drawing Sheets

U.S. PATENT DOCUMENTS

| | | | | |
|---|---|---|---|---|
| 4,365,177 A | * | 12/1982 | Madsen | 310/61 |
| 4,415,822 A | * | 11/1983 | Aiba | 310/59 |
| 4,486,676 A | * | 12/1984 | Moore et al. | 310/52 |
| 4,543,503 A | * | 9/1985 | Kaminski et al. | 310/59 |
| 4,546,279 A | * | 10/1985 | Hammer et al. | 310/59 |
| 4,656,382 A | * | 4/1987 | Moore et al. | 310/270 |
| 4,709,177 A | * | 11/1987 | Kaminski | 310/59 |
| 4,922,147 A | * | 5/1990 | Sismour, Jr. et al. | 310/61 |
| 4,967,465 A | * | 11/1990 | Frank | 29/598 |
| 5,252,880 A | * | 10/1993 | Kazmierczak et al. | 310/270 |
| 5,593,274 A | | 1/1997 | Carreno et al. | 415/115 |
| 5,644,179 A | | 7/1997 | Staub et al. | 310/65 |
| 5,869,912 A | * | 2/1999 | Andrew et al. | 310/52 |
| 6,204,580 B1 | * | 3/2001 | Kazmierczak | 310/52 |
| 6,252,318 B1 | * | 6/2001 | Kazmierczak | 310/61 |
| 6,339,268 B1 | * | 1/2002 | Kaminski et al. | 310/61 |
| 6,346,754 B1 | * | 2/2002 | Kieda et al. | 310/58 |
| 6,392,326 B1 | * | 5/2002 | Turnbull et al. | 310/270 |
| 6,417,586 B1 | * | 7/2002 | Jarczynski et al. | 310/61 |
| 6,452,294 B1 | * | 9/2002 | Vandervort et al. | 310/64 |
| 6,462,458 B1 | * | 10/2002 | Tong et al. | 310/270 |
| 6,465,917 B2 | * | 10/2002 | Wetzel et al. | 310/61 |
| 6,495,943 B2 | * | 12/2002 | Wetzel et al. | 310/264 |
| 6,498,408 B2 | * | 12/2002 | Tong et al. | 310/65 |

* cited by examiner

RE-ENTRANT SPACEBLOCK CONFIGURATION FOR ENHANCING CAVITY FLOW IN ROTOR ENDWINDING OF ELECTRIC POWER GENERATOR

BACKGROUND OF THE INVENTION

The present invention relates to enhanced cooling of generator rotors.

The power output rating of dynamoelectric machines, such as large turbo-generators, is often limited by the ability to provide additional current through the rotor field winding because of temperature limitations imposed on the electrical conductor insulation. Therefore, effective cooling of the rotor winding contributes directly to the output capability of the machine. This is especially true of the rotor end region, where direct, forced cooling is difficult and expensive due to the, typical construction of these machines. As prevailing market trends require higher efficiency and higher reliability in lower cost, higher-power density generators, cooling the rotor end region becomes a limiting factor.

Turbo-generator rotors typically consist of concentric rectangular coils mounted in slots in a rotor. The end portions of the coils (commonly referred to as endwindings), which are beyond the support of the main rotor body, are typically supported against rotational forces by a retaining ring (see FIG. 1). Support blocks are placed intermittently between the concentric coil endwindings to maintain relative position and to add mechanical stability for axial loads, such as thermal loads (see FIG. 2). Additionally, the copper coils are constrained radially by the retaining ring on their outer radius, which counteracts centrifugal forces. The presence of the spaceblocks and retaining ring results in a number of coolant regions exposed to the copper coils. The primary coolant path is axial, between the spindle and the bottom of the endwindings. Also, discrete cavities are formed between coils by the bounding surfaces of the coils, blocks and the inner surface of the retaining ring structure. The endwindings are exposed to coolant that is driven by rotational forces from radially below the endwindings into these cavities (see FIG. 3). This heat transfer tends to be low. This is because according to computed flow pathlines in a single rotating end winding cavity from a computational fluid dynamic analysis, the coolant flow enters the cavity, traverses through a primary circulation and exits the cavity. Typically, the circulation results in low heat transfer coefficients especially near the center of the cavity. Thus, while this is a means for heat removal in the endwindings, it is relatively inefficient.

Various schemes have been used to route additional cooling gas through the rotor end region. All of these cooling schemes rely on either (1) making cooling passages directly in the copper conductors by machining grooves or forming channels in the conductors, and then pumping the gas to some other region of the machine, and/or (2) creating regions of relatively higher and lower pressures with the addition of baffles, flow channels and pumping elements to force the cooling gas to pass over the conductor surfaces.

Some systems penetrate the highly stressed rotor retaining ring with radial holes to allow cooling gas to be pumped directly alongside the rotor endwindings and discharged into the air gap, although such systems can have only limited usefulness due to the high mechanical stress and fatigue life considerations relating to the retaining ring.

If the conventional forced rotor end cooling schemes are used, considerable complexity and cost are added to rotor construction. For example, directly cooled conductors must be machined or fabricated to form the cooling passages. In addition, an exit manifold must be provided to discharge the gas somewhere in the rotor. The forced cooling schemes require the rotor end region to be divided into separate pressure zones, with the addition of numerous baffles, flow channels and pumping elements—which again add complexity and cost.

If none of these forced or direct cooling schemes are used, then the rotor endwindings are cooled passively. Passive cooling relies on the centrifugal and rotational forces of the rotor to circulate gas in the blind, dead-end cavities formed between concentric rotor windings. Passive cooling of rotor endwindings is sometimes also called "free convection" cooling.

Passive cooling provides the advantage of minimum complexity and cost, although heat removal capability is diminished when compared with the active systems of direct and forced cooling. Any cooling gas entering the cavities between concentric rotor windings must exit through the same opening since these cavities are otherwise enclosed—the four "side walls" of a typical cavity are formed by the concentric conductors and the insulating blocks that separate them, with the "bottom" (radially outward) wall formed by the retaining ring that supports the endwindings against rotation. Cooling gas enters from the annular space between the conductors and the rotor spindle. Heat removal is thus limited by the low circulation velocity of the gas in the cavity and the limited amount of the gas that can enter and leave these spaces.

In typical configurations, the cooling gas in the end region has not yet been fully accelerated to rotor speed, that is, the cooling gas is rotating at part rotor speed. As the fluid is driven into a cavity by means of the relative velocity impact between the rotor and the fluid, the heat transfer coefficient is typically highest near the spaceblock that is downstream relative to the flow direction—where the fluid enters with high momentum and where the fluid coolant is coldest. The heat transfer coefficient is also typically high around the cavity periphery. The center of the cavity receives the least cooling.

Increasing the heat removal capability of passive cooling systems will increase the current carrying capability of the rotor providing increased rating capability of the generator whole maintaining the advantage of low cost, simple and reliable construction.

U.S. Pat. No. 5,644,179, the disclosure of which is incorporated by reference describes a method for augmenting heat transfer by increasing the flow velocity of the large single flow circulation cell by introducing additional cooling flow directly into, and in the same direction as, the naturally occurring flow cell. This is shown in FIGS. 4 and 5. While this method increases the heat transfer in the cavity by augmenting the strength of the circulation cell, the center region of the rotor cavity was still left with low velocity and therefore low heat transfer. The same low heat transfer still persists in the corner regions.

Spaceblocks are an essential feature of generator endwindings. In addition to defining the cavity spaces between concentric rotor coils where the cooling of the endwinding occurs, the spaceblocks enhance the cooling flow entrained into the cavity. The process of entraining cooling flow into the rotating cavities, can be viewed as made up of two factors: A radially outward centrifugal force and a radial return path enhanced by a low-pressure region.

BRIEF SUMMARY OF THE INVENTION

The present invention provides for enhanced cooling of generator rotors. More particularly, in an embodiment of the invention, a re-entrant geometric feature is provided on the trailing or downstream wall of the spaceblock to cause a further pressure reduction in the low-pressure region defined adjacent the downstream wall of the spaceblock. The ability of the spaceblock to enhance the radially outward centrifugal force that entrains cooling flow into the rotating cavity is not attenuated by the re-entrant geometric feature.

More specifically, the invention proposes to enhance the rotating cavity cooling flow by lowering the suction pressure developed at the trailing edge of the spaceblock. In an embodiment of the invention, this effect is produced by the introduction of a re-entrant contour to the existing block configuration while maintaining the block's ability to aid the entrainment of cooling flow from the annular passage, between the rotor coils and the shaft spindle, into the cavity.

In an exemplary embodiment, the invention modifies existing spaceblocks thus minimizing impact on the overall design of the generator assembly.

Thus, the invention is embodied in a gas cooled dynamoelectric machine that comprises a rotor having a body portion, axially extending coils, end turns defining a plurality of endwindings and at least one spaceblock is located between adjacent endwindings so as to define cavities therebetween, and wherein a downstream wall of the spaceblock has a non-planar contour to lower a suction pressure developed adjacent the trailing edge of the spaceblock to enhance cooling flow.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
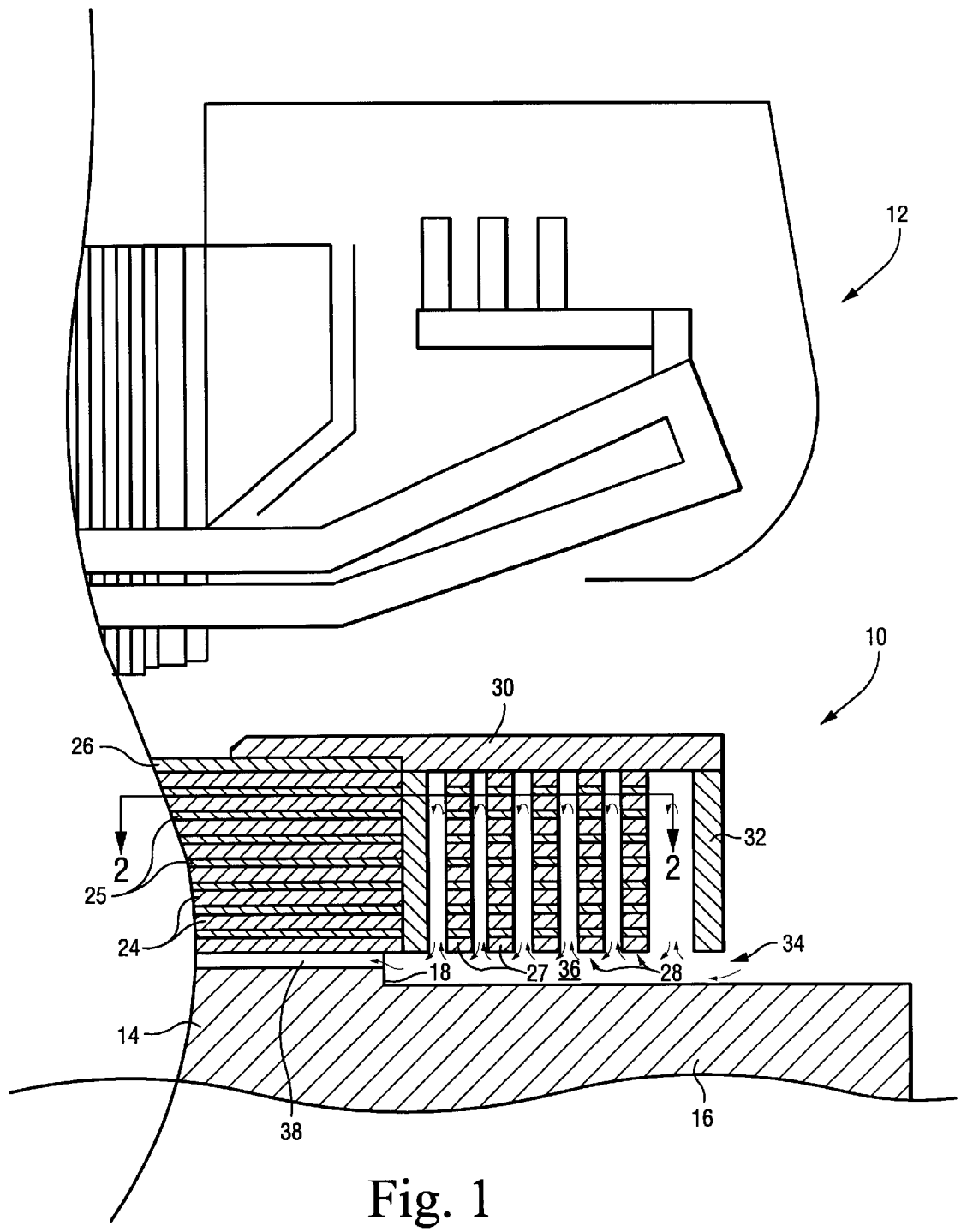
FIG. 1 is a cross-sectional view of a portion of the end turn region of a dynamoelectric machine rotor with stator in opposed facing relation thereto.
Figure 2:
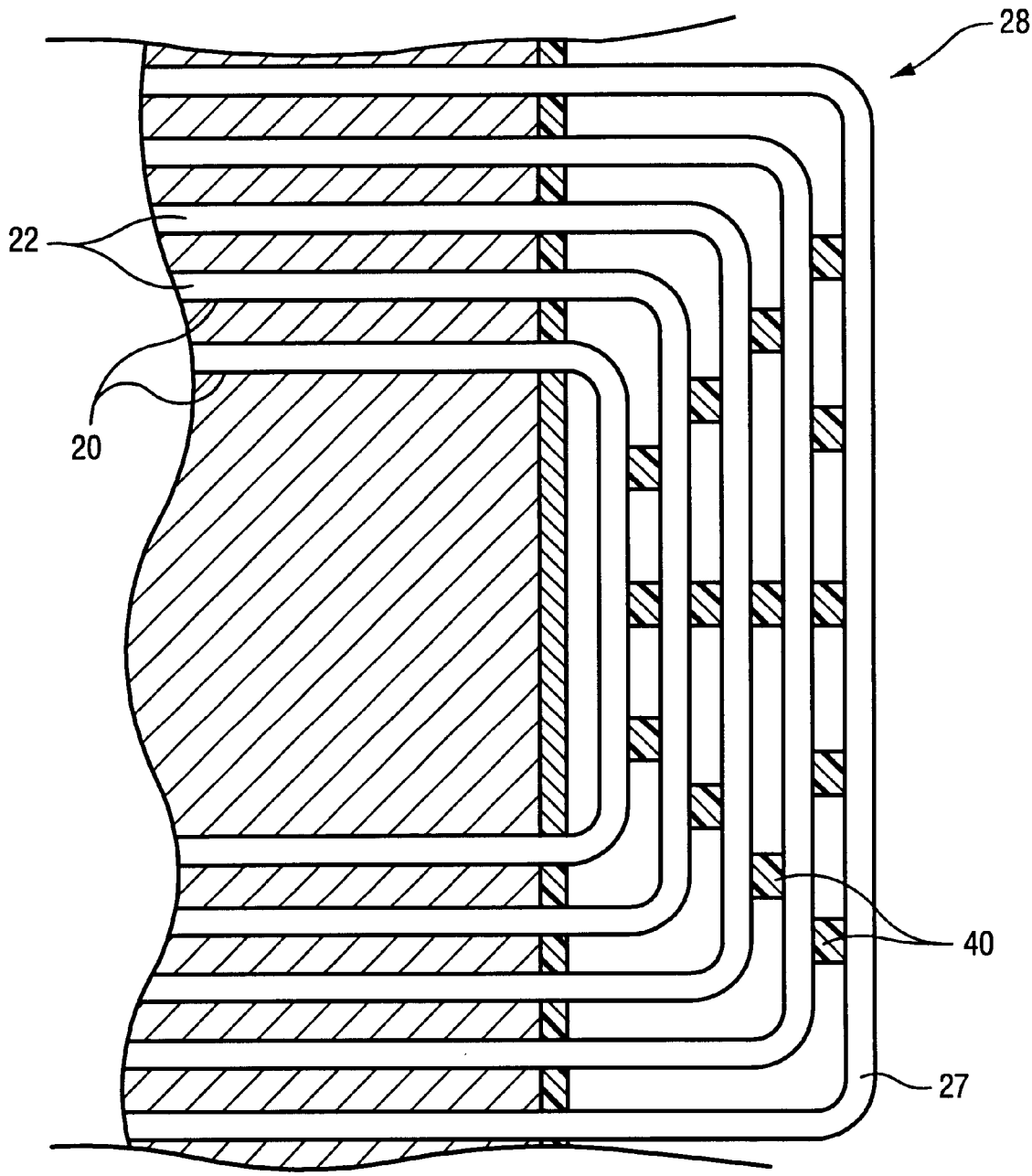
FIG. 2 is a cross-sectional top view of the dynamoelectric machine rotor taken along line 2—2 of FIG. 1.

Referring to the drawings wherein identical reference numerals denote the same elements throughout the various views, FIGS. 1 and 2 show a rotor 10 for a gas-cooled dynamoelectric machine, which also includes a stator 12 surrounding the rotor. The general operation of dynamoelectric machines such as large turbo-generators is well known and needs not be described here. The rotor includes a generally cylindrical body portion 14 centrally disposed on a rotor spindle 16 and having axially opposing end faces, of which a portion 18 of one end face is shown in FIG. 1. The body portion is provided with a plurality of circumferentially-spaced, axially extending slots 20 for receiving concentrically arranged coils 22, which make up the rotor winding. For clarity, only five rotor coils are shown, although several more are commonly used in practice.

Specifically, a number of conductor bars 24 constituting a portion of the rotor winding are stacked in each one of the slots. Adjacent conductor bars are separated by layers of electrical insulation 25. The stacked conductor bars are typically maintained in the slots by wedges 26 (FIG. 1) and are made of a conductive material such as copper. The conductor bars 24 are interconnected at each opposing end of the body portion by end turns 27, which extend axially beyond the end faces to form stacked endwindings 28. The end turns are also separated by layers of electrical insulation.

Referring specifically to FIG. 1, a retaining ring 30 is disposed around the end turns at each end of the body portion to hold the endwindings in place against centrifugal forces. The retaining ring is fixed at one end to the body portion and extends out over the rotor spindle 16. A centering ring 32 is attached to the distal end of the retaining ring 30. It should be noted that the retaining ring 30 and the center ring 32 can be mounted in other ways, as is known in the art. The inner diameter of the centering ring 32 is radially spaced from the rotor spindle 16 so as to form a gas inlet passage 34 and the endwindings 28 are spaced from the spindle 16 so as to define an annular region 36. A number of axial cooling channels 38 formed along slots 20 are provided in fluid communication with the gas inlet passage 34 via the annular region 36 to deliver cooling gas to the coils 22.

Turning to FIG. 2, the endwindings 28 at each end of the rotor 10 are circumferentially and axially separated by a number of spacers or spaceblocks 40. (For clarity of illustration, the spaceblocks are not shown in FIG. 1). The spaceblocks are elongated blocks of an insulating material located in the spaces between adjacent endwindings 28 and extend beyond the full radial depth of the endwindings into the annular gap 36. Accordingly, the spaces between the concentric stacks of the end turns 27 (hereinafter endwindings) are divided into cavities. These cavities are bounded on the top by the retaining ring 30 and on four sides by adjacent endwindings 28 and adjacent spaceblocks 40. As best seen in FIG. 1, each of these cavities is in fluid communication with the gas inlet passage 34 via the annular region 36. Air flow is shown by arrows in FIG. 1. A portion of the cooling gas entering the annular region 36 between the endwinding 28 and the rotor spindle 16 through the gas inlet passage 34 thus enters the cavities 42, circulates therein, and then returns to the annular region 36 between the endwinding and the rotor spindle. The inherent pumping action and rotational forces acting in a rotating generator cavity produce a large single flow circulation cell, as schematically shown with arrows in FIG. 3.

The present invention proposes to reshape the rotor cavity spaceblocks to produce an enhanced low pressure region in the trailing edge of the spaceblock. More specifically, the invention provides a re-entrant contour that will enhance the strength of the trailing vortices and induce greater cooling flow through the rotating cavities to thereby increase heat transfer.

Figure 3:
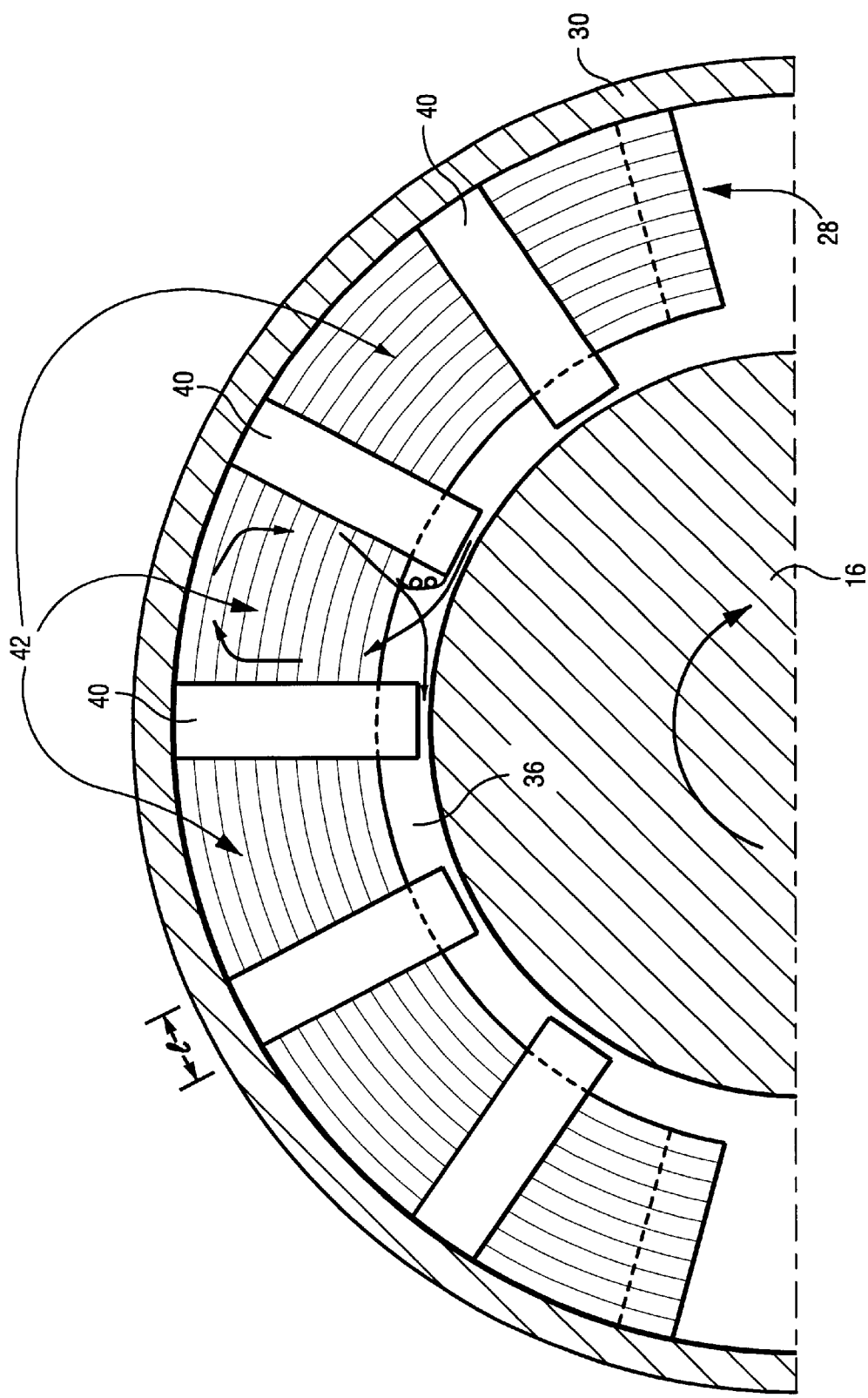
FIG. 3 is a schematic illustration showing passive gas flow into and through endwinding cavities.
Figure 4:
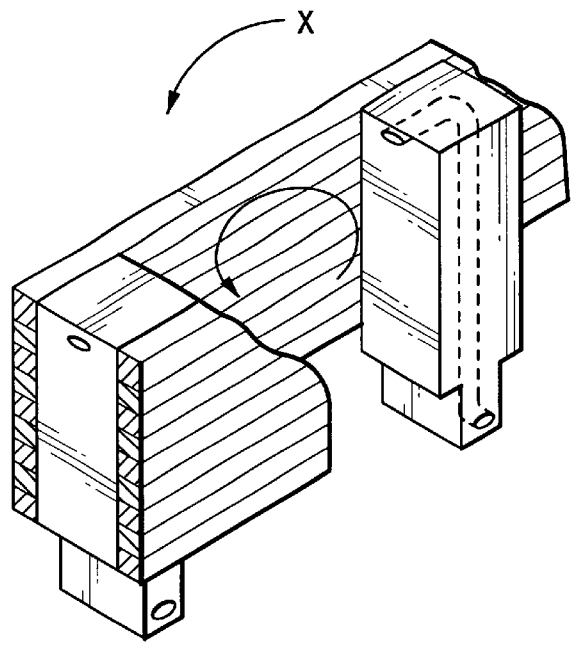
FIG. 4 is a perspective view, partly broken-away of a portion of the rotor end turn region in accordance with a first embodiment of the invention disclosed in U.S. Pat. No. 5,644,179.
Figure 5:
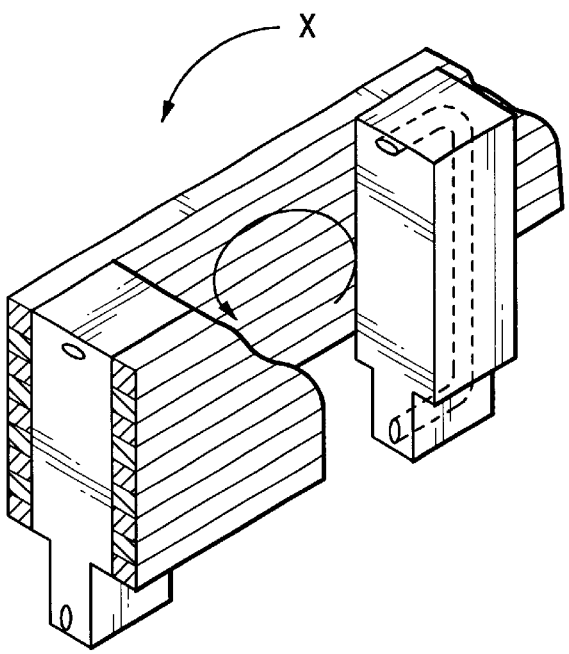
FIG. 5 is a perspective view, partly broken away, of a portion of the rotor end turn region showing a second embodiment of the invention of U.S. Pat. No. 5,644,179.
Figure 6:
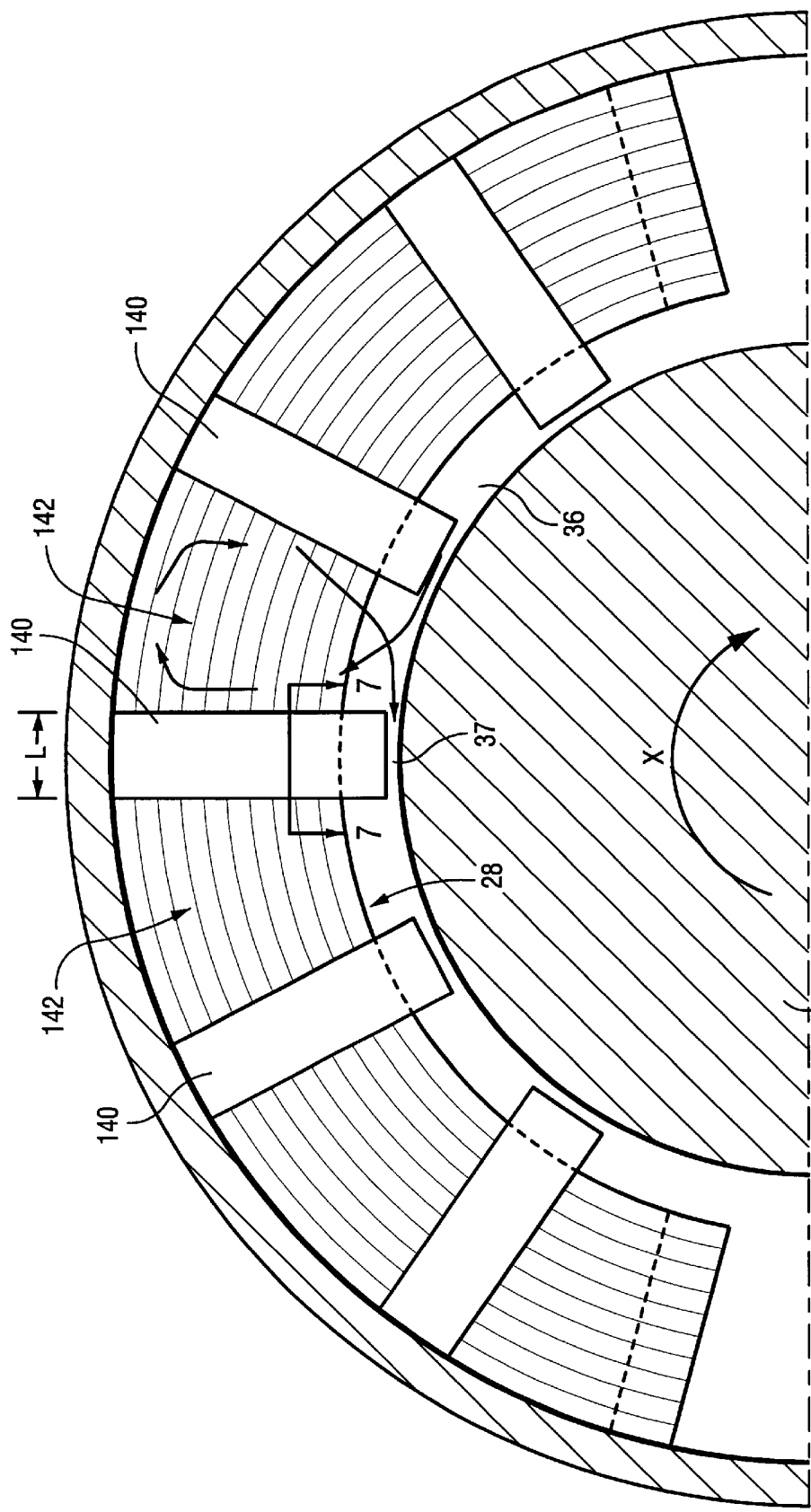
FIG. 6 is a partial section of the rotor endwinding showing a series of cavities in an embodiment of the invention.

Referring now to FIG. 6, there is illustrated a partial section of the rotor endwinding similar to that illustrated in FIG. 3, but showing spaceblocks according to an embodiment of the invention. In this illustration, several cavities 142 are shown with the direction of rotation indicated by arrow X. In accordance with an embodiment of the present invention, at least one and more preferably each spaceblock 140 is provided with a contoured rearward facing or downstream wall to produce an enhanced lower pressure region at the trailing edge of the respective spaceblock.

Figure 7:
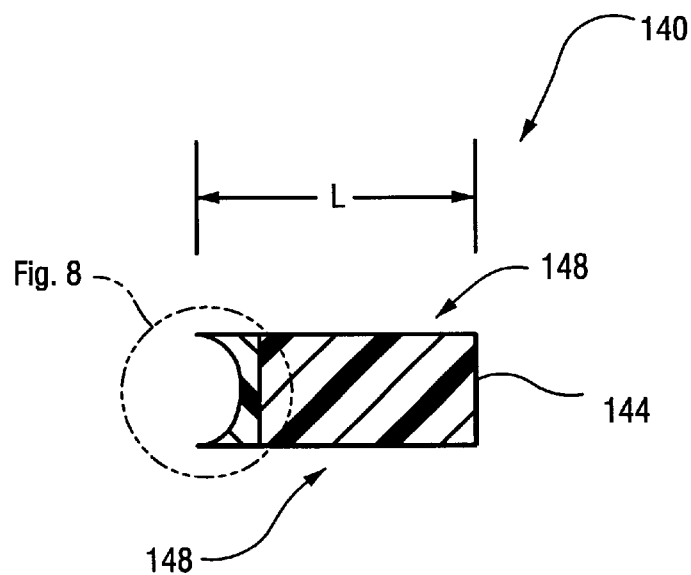
FIG. 7 is a cross-sectional view taken along line 7—7 of FIG. 6.
Figure 8:
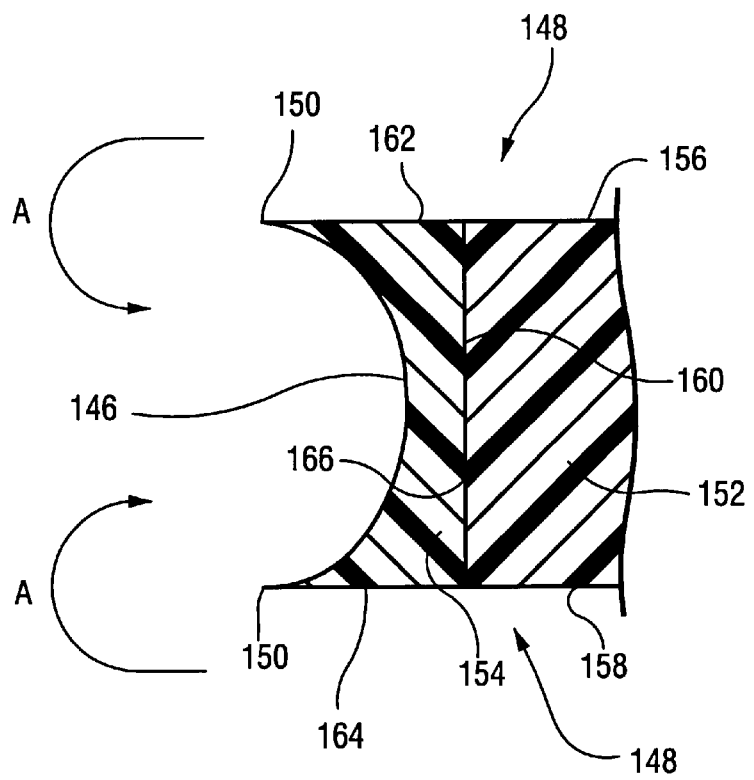
FIG. 8 is an enlarged detail of the designated portion of FIG. 7.

In the illustrated embodiment, a re-entrant contour is provided as best seen in FIGS. 7 and 8 to enhance the strength of the trailing vortices and induce greater cooling flow into and through the rotating cavities 142. Thus, as shown by arrows A, coolant flow in the annular passage 36 on each axial side of the spaceblock 140 will be drawn inwardly in to the region rearward of the associated spaceblock, thereby to facilitate flow of that coolant, along with coolant flowing through gap 37 beneath the spaceblock, into the respective downstream cavity. In the illustrated embodiment, the re-entrant contour is defined as a part circular curved rearward facing or downstream wall 146 disposed between the generally flat axial walls 148 of the spaceblock. As can be seen in FIG. 7, the part circular wall 146 intersects each generally planar axial wall 148 of the spaceblock 140 to define first and second trailing knife edges 150 of the respective spaceblock. The forward facing or upstream wall 144, with respect to the direction of rotation of the rotor, is generally planar as in the conventional structure to reduce flow into the cavity forwardly therefrom.

As schematically illustrated in FIGS. 7–8, the spaceblock 140 may be provided as an assembly of a main body portion 152 of generally rectangular cross-section and a re-entrant portion 154. The main body portion 152 has first and second side wall portions 156, 158 for engaging adjacent endwindings 28, an upstream wall 144, and a downstream wall 160 engaged with the re-entrant portion. The re-entrant portion has first and second sidewall portions 162, 164 for engaging adjacent endwindings 28, an upstream wall 166 for engaging wall 160, and concavely curved downstream wall 146 for enhancing entrained coolant flow. Thus, side wall portions 156 and 162 together define one wall 148 of the spaceblock 140 and side wall portions 158 and 164 together define the other wall 148 of spaceblock 140. Where the spaceblock is provided as a two part assembly, the re-entrant portion 154 may be retrofitted to a conventional spaceblock 40, in which case the spaceblock assembly 140 will have a circumferential length, identified by reference "L" in FIGS. 6 and 7, that is greater than the circumferential length "l" of a conventional spaceblock 40. Most preferably, however, the spaceblock 140 is provided as an integrated one piece structure, including the generally flat side walls 148 for engaging the respective endwindings 28 and which terminate at edges 150 of the smoothly contoured rearward wall 146. As noted above, the spaceblock 140 has a generally flat upstream wall 144 in the illustrated embodiment, as in the conventional structure, to continue to permit the introduction of flow into the upstream cavity.

In operation, rotor rotation will cause cooling gas to be drawn from the gas inlet passage 34 into the annular region 36 between the endwindings 28 and the rotor spindle 16. This cooling gas flow will have axial and circumferential velocity components. The spaceblocks 140 protrude into the annular region 36 between the endwinding and the rotor spindle, thus intercepting some of the cooling flow and directing the same to a circulating flow through the associated cavity 142. Cooling flow reentering the annular region 36 from an upstream cooling cavity as well as the flow in the annular region itself can flow below, through gap 37, and on each axial side of the respective spaceblock, downstream to a next cooling cavity and/or to continue in the annular region. The cooling fluid flow on each annular side of the respective spaceblocks will tend to flow into the region circumferentially aligned with and downstream of the spaceblocks due to the low pressure region produced at the trailing edge of the spaceblock which is enhanced by the re-entrant contour of the spaceblocks of the invention. The cooling flow that is entrained to flow into the cavity is thus increased by providing the re-entrant contour.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. A gas cooled dynamoelectric machine, comprising:
   a rotor having a body portion, said rotor having axially extending coils and end turns defining a plurality of endwindings extending axially beyond at least one end of said body portion; and
   at least one spaceblock located between adjacent said endwindings so as to define cavities therebetween, said spaceblock having first and second side walls engaging said adjacent endwindings, an upstream wall, and a downstream wall, said downstream wall of said spaceblock having a non-planar contour to lower a suction pressure developed adjacent a trailing edge of the spaceblock to enhance cooling flow, wherein said downstream wall has a re-entrant contour to enhance rotating cavity cooling flow, wherein said downstream wall is defined as a generally part circular concave curve.

2. The dynamoelectric machine of claim 1, wherein said upstream wall is generally planar.

3. The dynamoelectric machine of claim 1, wherein said spaceblock is comprised of a generally rectangular main body portion and a re-entrant portion, said main body portion defining said upstream wall and portions of said side walls, and said re-entrant portion defining other portions of said side walls, and said downstream wall.

4. The dynamoelectric machine of claim 3, wherein said downstream wall is defined as a generally part circular concave curve.

5. The dynamoelectric machine of claim 3, wherein said upstream wall is generally planar.

6. The dynamoelectric machine of claim 3, wherein said re-entrant portion is integrally formed with said main body portion.

7. A gas cooled dynamoelectric machine, comprising:
   a rotor having a spindle and a body portion;
   a rotor winding comprising axially extending coils disposed on said body portion and spaced, concentric endwindings extending axially beyond at least one end of said body portion, said endwindings and said spindle defining an annular space therebetween;
   a plurality of spaceblocks located between adjacent ones of said endwindings thereby to define a plurality of cavities, each bounded by adjacent spaceblocks and adjacent endwindings and open to said annular space; and
   each said spaceblock having first and second side walls engaging said adjacent endwindings, an upstream wall, and a downstream wall, said downstream wall of at least one of said spaceblocks having a non-planar contour to lower a suction pressure developed adjacent a trailing edge of the spaceblock to enhance cooling flow, wherein said non-planar downstream wall has a re-entrant contour to enhance rotating cavity cooling flow, wherein said non-planar downstream wall is defined as a generally part circular concave curve.

8. The dynamoelectric machine of claim 7, wherein said upstream wail of each said spaceblock is generally planar.

9. The dynamoelectric machine of claim 7, wherein said at least one spaceblock is comprised of a generally rectangular main body portion and a re-entrant portion, said main body portion defining said upstream wall and portions of said side walls, and said re-entrant portion defining other portions of said side walls, and said downstream wall.

10. The dynamoelectric machine of claim 9, wherein said upstream wall is generally planar.

11. The dynamoelectric machine of claim 9, wherein said re-entrant portion is integrally formed with said main body portion.

12. The dynamoelectric machine of claim 1, further comprising a rotor spindle extending axially beyond said at least one end of said body portion and defining an annular space with said endwindings, and wherein said at least one spaceblock extends radially into said annular space.

13. The dynamoelectric machine of claim 7, wherein said plurality of spaceblocks extend radially into said annular space.

* * * * *